United States Patent
Cozmei (10) Patent No.: US 7,975,262 B2
(45) Date of Patent: Jul. 5, 2011

(54) ERROR TRACING WITH CONTEXT HISTORY

(75) Inventor: Catalin Cozmei, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 992 days.

(21) Appl. No.: 11/840,207

(22) Filed: Aug. 16, 2007

(65) Prior Publication Data

US 2009/0049428 A1 Feb. 19, 2009

(51) Int. Cl.
G06F 9/44 (2006.01)

(52) U.S. Cl. .......................................... 717/128

(58) Field of Classification Search .................. 717/124, 717/127, 128
See application file for complete search history.

(56) References Cited

U.S. PATENT DOCUMENTS

| | | | |
|---|---|---|---|
| 6,202,173 B1 | 3/2001 | Hollett et al. | |
| 6,219,826 B1 | 4/2001 | De Pauw et al. | |
| 6,275,956 B1 | 8/2001 | On et al. | |
| 6,539,501 B1 | 3/2003 | Edwards | |
| 6,862,711 B1 | 3/2005 | Bahrs et al. | |
| 7,120,901 B2 | 10/2006 | Ferri et al. | |
| 7,210,071 B2 | 4/2007 | Deacon et al. | |
| 2003/0081003 A1 | 5/2003 | Kutay et al. | |
| 2005/0060574 A1 | 3/2005 | Klotz et al. | |
| 2005/0102635 A1 | 5/2005 | Jiang et al. | |
| 2006/0129569 A1 | 6/2006 | Dieberger et al. | |
| 2006/0156274 A1* | 7/2006 | Andreev et al. | 717/100 |
| 2008/0066083 A1* | 3/2008 | Ladd et al. | 719/318 |
| 2009/0006909 A1* | 1/2009 | Ladd et al. | 714/57 |
| 2009/0119548 A1* | 5/2009 | Kollmann et al. | 714/45 |
| 2009/0204693 A1* | 8/2009 | Andreev et al. | 709/221 |
| 2010/0030785 A1* | 2/2010 | Wilson et al. | 707/10 |
| 2010/0223491 A1* | 9/2010 | Ladd et al. | 714/2 |

OTHER PUBLICATIONS

Elise Hewett et al "A Survey of Static and Dynamic Analyzer Tools", 2003, 10 pages.
Will Robertson et al. "Integrating Software Productivity Tools into Eclipse", Proceedings of the 2003 OOPSLA workshop on eclipse technology eXchange, 2003, p. 40-44.
Daniel Pierce Delorey "Observational Studies of Software Engineering Using Data from Software Repositories", Department of Computer Science, Apr. 2007, 85 pages.

* cited by examiner

Primary Examiner — Anna Deng (57) ABSTRACT

Trace messages generated during execution of programming code are logged in a trace log. The logged trace messages logged during execution of a portion of the programming code are deleted from the trace log when the portion of programming code executes without an error. The logged trace messages are kept in the trace log when an error occurs during execution of the portion of the programming code. The trace log is output when the execution of the programming code ends.

19 Claims, 7 Drawing Sheets

01 – Doing action no. 01 (2006-10-10 11:46:56)
2006-10-10 11:46:56      1724 938      COMAPI      -------------
................
02 – Doing action no.02 (2006-10-10 11:46:57)
2006-10-10 11:46:57         788 408      DnldMgr      *************
................

21 – Doing action no.21 (2006-10-10 11:46:58)
  2006-10-10    11:46:58 788 408 Agent       *  Title = Windows Malicious Software Removal Tool - September 2006 (KB890830)
  ................

31 – Doing action no.31 (2006-10-10 11:46:59)
    2006-10-10    11:46:59 2216 e34 DtaStor Update service properties:
    ................
      32 – Doing action no.32 (2006-10-10 11:46:59)
    2006-10-10    11:46:59 788 408 DnldMgr
    ............................

41 – Doing action no.41 (2006-10-10 11:47:02)
        2006-10-10    11:47:02  788 c48 DnldMgr BITS job {7B565949-0DD3-45E6-9E14-8F6411348EFC} completed successfully
        2006-10-10    11:47:02  788 c48 DnldMgr   Download job bytes total = 3863976, bytes transferred = 0
        2006-10-10    11:47:02  788 c48 DnldMgr ******** DnldMgr: New download job [UpdateId = {DF70204B-CCF3-4325-B5C8-61DA67393C04}.100] ********
        2006-10-10    11:47:02  788 c48 DnldMgr   * All files for update were already downloaded and are valid.
        2006-10-10    11:47:02  788 c48 DnldMgr ******** DnldMgr: New download job [UpdateId = {0F654B54-2B7B-4FE8-862F-61EF23DA326D}.103] ********
        2006-10-10    11:47:02  788 c48 DnldMgr   * BITS job initialized, JobId = {5A4BAB9E-BC7E-4302-83A9-64B79C7D65FF}
        42 – Doing action no.42 (2006-10-10 11:47:03)
        2006-10-10    11:47:03 788  c48    DnldMgr
        ................

ERROR TRACING WITH CONTEXT HISTORY

BACKGROUND

Most error tracing methods use different levels of tracing according to the level of detail needed. Computer code may include trace messages that are generated when the code is executed. The trace messages are usually put into a log file for later analysis and debugging by a user, such as a software tester. In some cases, the user may designate the level of tracing desired. For example, the tracing level may extend from minimal logging (i.e., logging of a small number of trace messages) to verbose logging (i.e., logging of numerous trace messages).

Usually, the default tracing level is minimal. Once a log is generated, a user analyzes the log by first looking for the time frame the error occurred. However, if more logging information is needed than the minimal default logging provides, then another run may be needed with an increased trace level in order to capture the necessary detailed logging to troubleshoot the error. But the error may not necessary reproduce during the re-run. Also, a re-run is an extra effort and may not be easy to perform. For example, the initial run may have been done on a remote location, in a different time zone, etc. Further, the second (verbose) log generated will contain redundant information that is not needed to analyze the actual error and only pollute the log making the troubleshooting process more difficult.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Embodiments of the invention are directed to error tracing with context history. When an error occurs in execution of computer code, trace messages generated by the code leading up to the error are kept in a log. Trace messages associated with successful actions are purged from the log. This allows detailed logging to be performed in a single run of the code without generating a bulky log that contains needless log entries and wastes resources.

Many of the attendant features will be more readily appreciated as the same become better understood by reference to the following detailed description considered in connection with the accompanying drawings.

BRIEF DESCRIPTION OF THE DRAWINGS

Like reference numerals are used to designate like parts in the accompanying drawings.

DETAILED DESCRIPTION

The detailed description provided below in connection with the appended drawings is intended as a description of the present examples and is not intended to represent the only forms in which the present examples may be constructed or utilized. The description sets forth the functions of the examples and the sequence of steps for constructing and operating the examples. However, the same or equivalent functions and sequences may be accomplished by different examples.

Embodiments of the invention provide error tracing with context history. In one embodiment, a trace tree is kept only in cases of an error (such as an exception). A trace tree branch corresponding to error free actions (like procedures or functions of a program) is trimmed. Thus, the log will contain historical context information from the beginning of the run till the point of error. The historical context information contains brief tracing corresponding to successful actions and detailed tracing only for the failure path. In one implementation, the highest level of tracing is turned on from the first run so that a re-run of tracing is not needed. Embodiments of the invention may be used in various types of code including test code and product code.

Getting rid of detailed logging for successful calls saves a lot of storage space. Detailed logging as desired may be used without a fear of consuming huge memory resources. In one embodiment, only the path from the beginning of the program to the point of error is kept as context/historical information, therefore isolating only the meaningful information related to the failure. Also, it easier for a user to review test logs where only detail logging is shown when errors occurred. Users do not have to waste time combing through logging of successful events searching for the error related events.

Figure 1:
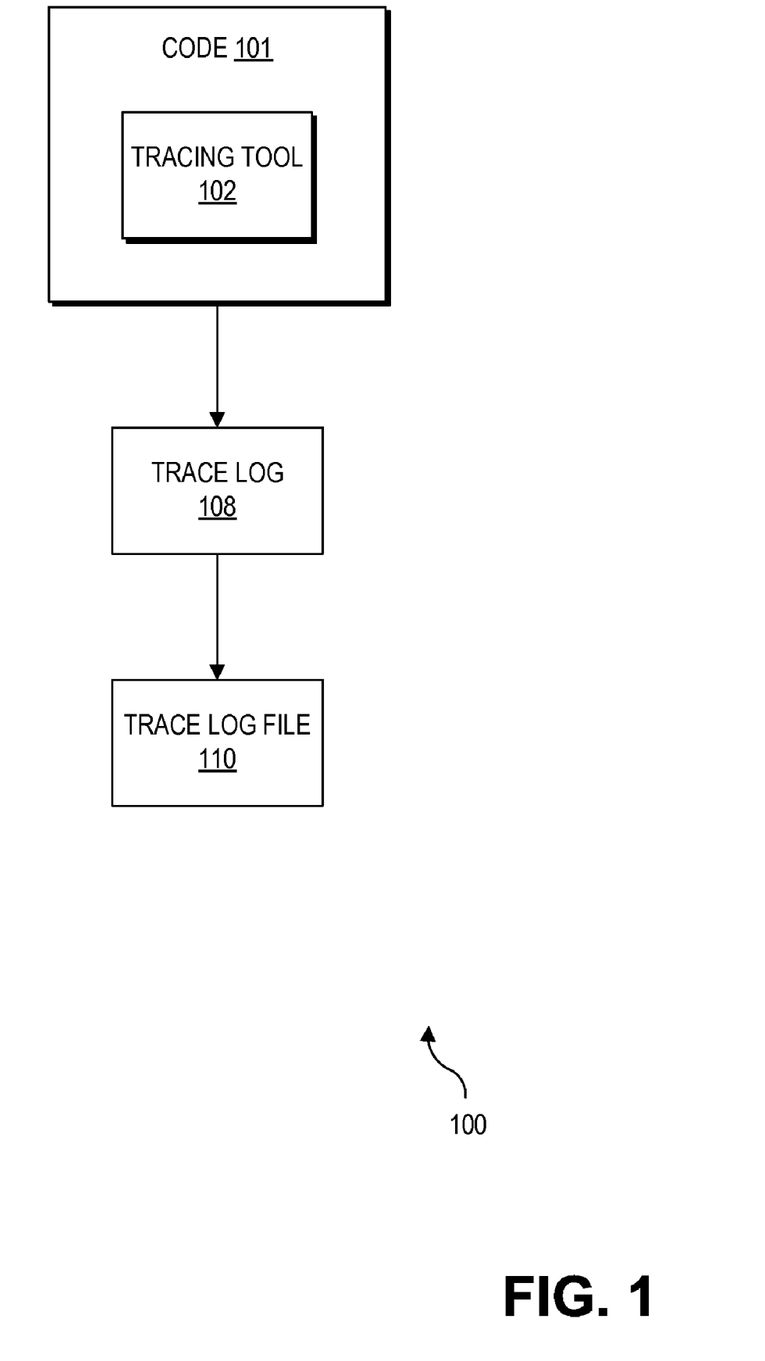
FIG. 1 is a block diagram of an error tracing system in accordance with an embodiment of the invention.

FIG. 1 shows an error tracing system 100 in accordance with an embodiment of the invention. In one embodiment, one or more components of system 100 may be implemented by computer readable instructions executable by one or more computing devices. An example computing device is discussed below in conjunction with FIG. 7.

System 100 includes a tracing tool 102 that is part of code 101. Code 101 may include test code, product code, and the like. Test code includes code for "exercising" code under test to invoke actions from the code under test. Product code includes code that is eventually released in a licensed product. Tracing is often used in pre-release builds of product code for software testing, debugging, and analysis.

Tracing tool 102 includes computer readable instructions to implement embodiments of the invention. In one embodiment, tracing tool 102 is called at the beginning of execution of code 101 to log trace messages generated during execution of code 101.

In one embodiment, tracing tool 102 includes a library that contains tracing functions that may be called from within code 101. One of the functions of the tracing library puts a tracing message in a tree-structured tracing log and may be called from anywhere in code 101 (e.g., before any main instruction or group of instructions). Other functions of the tracing library include a trimming function to trim the tracing log tree structure once a function in code 101 exits without error and a read-tree function that reads the tracing tree branch down to the error point should an error occur in code 101.

When trace messages are generated during execution of code 101, the trace messages are put in a trace log 108. In one embodiment, trace log 108 is maintained in memory of a computing device. When function calls return successfully (i.e., without an error occurring during execution of the function), then testing tool 102 removes any trace messages generated during execution of the function from trace log 108. However, when an error occurs during execution of the function, then trace messages generated up to the error are kept in trace log 108.

In one embodiment, when a first error occurs, execution of code 101 stops and the path to the first error is kept in trace log 108. In another embodiment, when a first error occurs, the path to the first error is kept in trace log 108, but execution of code 101 continues. If another error occurs, then the path to the second error is kept in trace log 108. Assuming no further errors occur, then in this case trace log 108 contains two sub-trees corresponding to the two errors that occurred during code execution. A user has discretion in deciding when to stop execution of code 101 when an error occurs. The user may choose whether to stop and output trace log 108 after a first error occurs or let execution continue.

In one embodiment, an error includes an exception. In general, an exception is raised/thrown when something out of the ordinary or unexpected occurs in program execution. In most cases, the exception will invoke separate code, such as an exception handler at the top of code 101 that catches all exceptions. Some exceptions may be treated as fatal errors, some as recoverable errors, and some merely as notifications. It is the code inside the exception handler that decides that.

In one embodiment, only fatal exceptions are considered error events by tracing tool 102 for trimming trace log 108. For example, tracing tool 102 may be configured to stop execution of code 101 when the first error occurs and persist trace log 108 to trace log file 110. For non-fatal exceptions, execution continues without outputting trace log 108 to trace log file 110. If a function returns with only non-fatal exceptions, then the function is considered to have returned successfully and trace log 108 will be trimmed. In other configurations, additional exception types (e.g., recoverable) may be considered an error by tracing tool 102 for trace message trimming. The user has the flexibility to configure tracing tool 102 with the tracing and trace log trimming constraints as desired.

In one embodiment, when execution of code 101 completes (e.g., code 101 stops because of an error or code 101 executes without error), trace log 108 is stored in a trace log file 110, such as on a hard disk drive. In another embodiment, when execution of code 101 completes, trace log 108 is displayed in an output device for viewing by a user.

Figure 2:
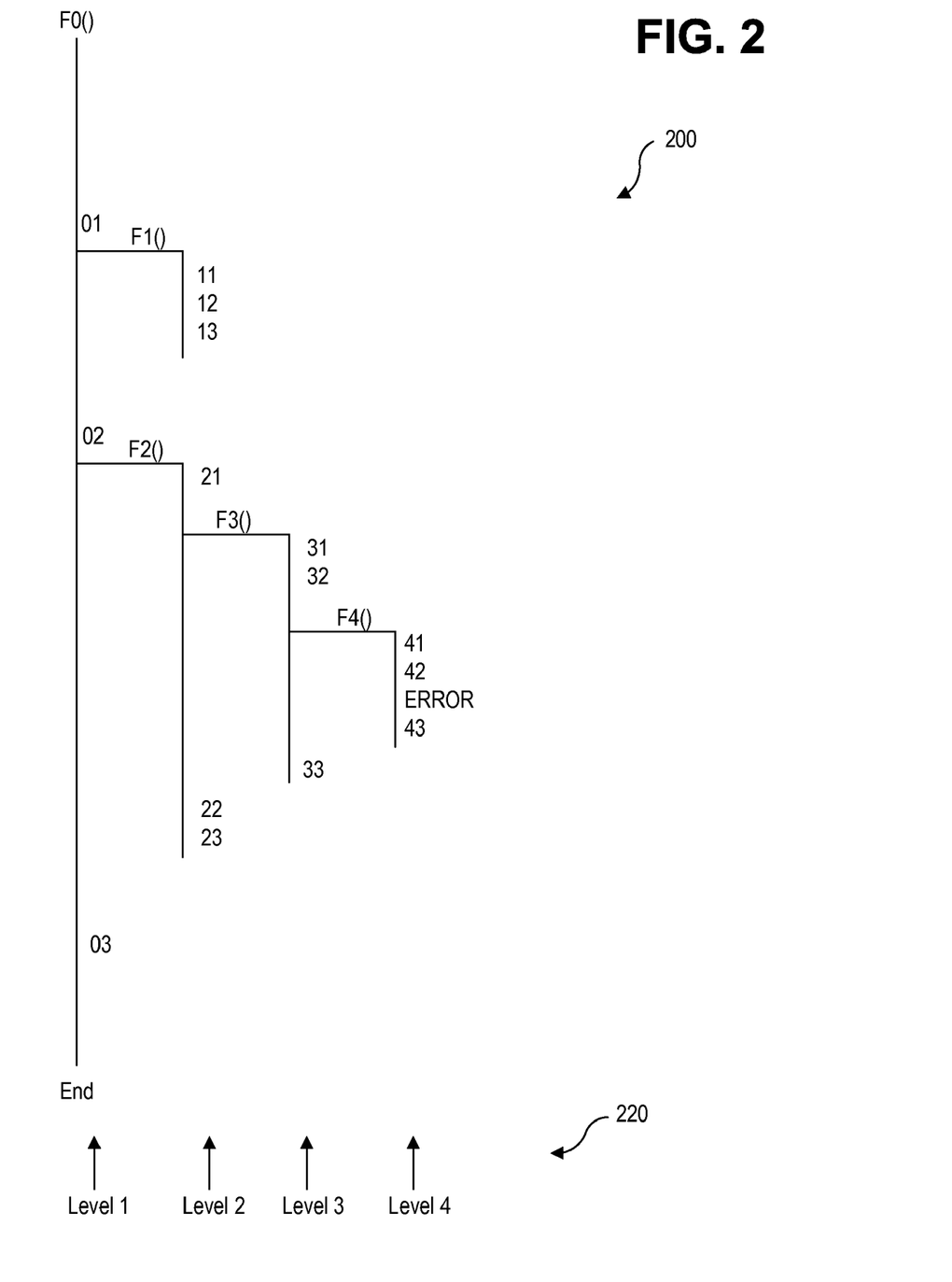
FIG. 2 is an example of error tracing in accordance with an embodiment of the invention.
Figure 3:
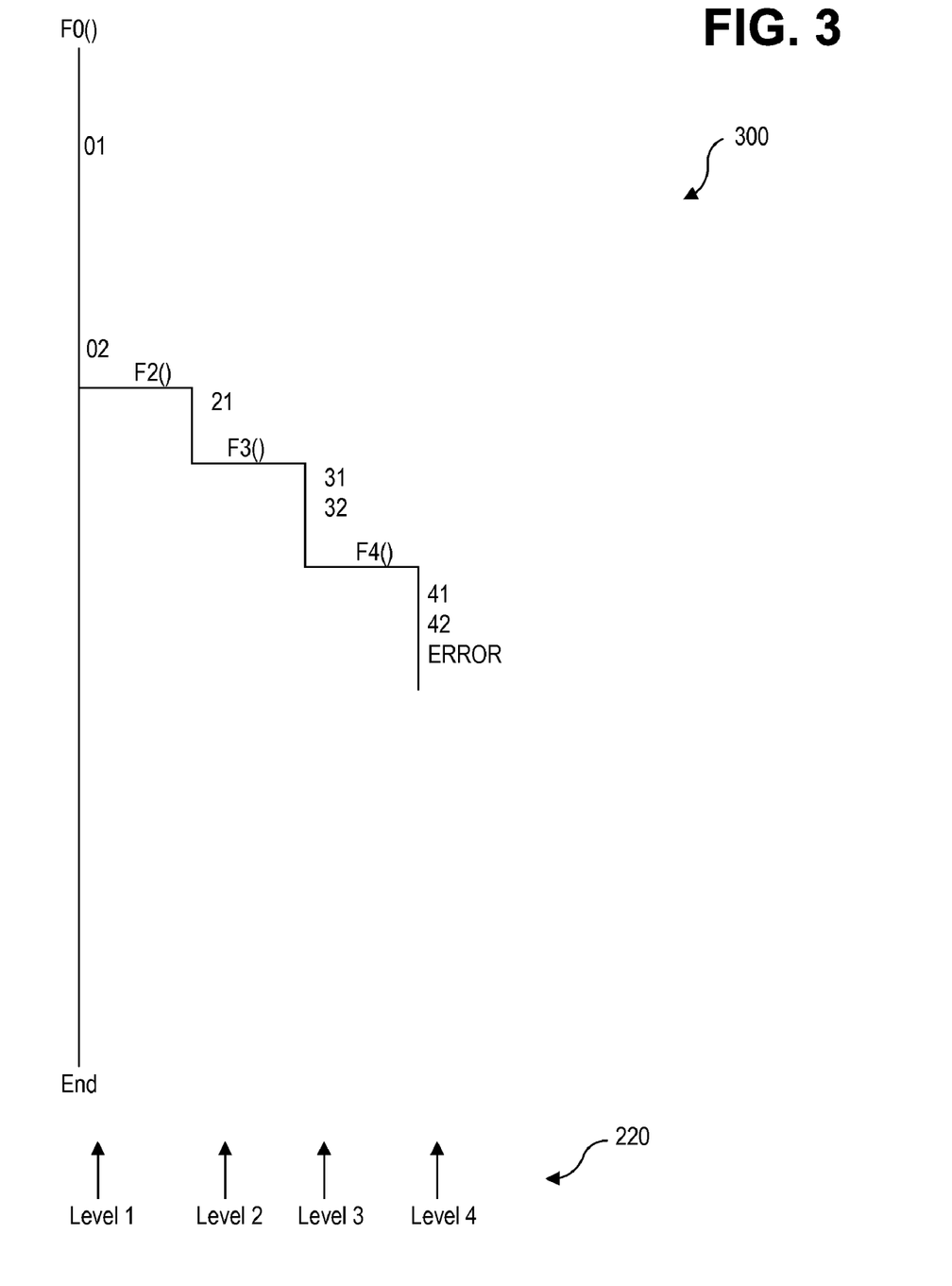
FIG. 3 is an example of error tracing in accordance with an embodiment of the invention.

Turning to FIGS. 2-3, examples of error tracing using tree data structures is shown. FIG. 2 shows a tree 200 of tracing in a program without trimming the sub-trees. FIG. 3 shows a tree 300 having trimmed sub-trees as described herein. In one embodiment, tracing tool 102 generates and manages the tree data structure of tree 300. In one embodiment, tree 300 is generated and manipulated in memory of a computing device. Once the trace tree is trimmed in memory, the tree is outputted to a trace log file. While embodiments of the invention are described using tree data structures to log trace messages, one skilled in the art having the benefit of this description will appreciated that alternative data structures may be used.

FIGS. 2-3 show the tracing of program code having the following program flow: function f0( ) calls function f1( ) and function f2( ), function f2( ) calls function f3( ) which calls function f4( ). During execution, the functions log trace message as follows: f00 logs trace messages 01, 02, 03; f1( ) logs trace messages 11, 12 and 13; f2( ) logs trace messages 21, 22, 23; f3( ) logs trace messages 31, 32, 33; and f4( ) logs trace messages 41, 42, 43. The overall function calling pattern with messages logged by each function is shown in FIG. 2. Calling of a function generates a new tree branch (i.e., a sub-tree). The call levels 1-4 of the functions calls are shown at 220. As used herein, level 1 is considered a "higher level" as to level 2 and level 3 is considered a "lower level" as to level 2. In one embodiment, all logged trace messages are time stamped. Time stamping provides for better debugging and provides an easy way to merge logs (discussed below).

If an error (e.g., an exception) occurs after message 42 but before message 43 in function f4( ) then tracing tool 102 keeps only the log messages shown in FIG. 3. Tracing tool 102 keeps each message logged in its tree data structure on a level equal with the function call depth. Once a function returns successfully, then all messages logged by that function (and by all the sub-functions called by that function) are deleted from the tree.

For example, f0( ) logs message 01 (on level 1), then calls function f1( ). Function f1( ), which logged 3 messages (11, 12 and 13) on level 2, returned successfully. Since f1( ) returned successfully, tracing tool 102 deletes all messages (i.e., tree nodes) belonging to level 2 (or higher, although in this instance, there are not any levels higher than level 2 for f1( )) of the tree (i.e., all three messages belonging to f1( )). Thus, only message (i.e., node) 01 is left.

Going further, as the logging progresses, message 02 is logged next in the tree on level 1 after message 01. Then function f0( ) calls function f2( ) which logs message 21 on level 2; f2( ) calls f3( ) which logs messages 31 and 32 on level 3. Function f3( ) then calls f4( ) which logs messages 41, 42 and 43 on level 4. As shown in FIG. 2, an error occurs in f4( ) after message 42 but before message 43. Tracing tool 102 will keep the logged messages along the tree branch to the error (as shown in FIG. 3). This sub-tree will be stored in trace log file 110. In one embodiment, trace log file 110 is displayed to a user using the actual tree data structure (indented by levels) as shown in FIG. 3.

The trace generates not only node information (i.e., messages 02, 21, 32) usually present by dumping the program stack trace, but also time stamps and context information that historically extends from the starting point of the program till the point where the error occurred. The extra messages that provide context to the trace are 01, 31, 41 and 42. A user can setup the trace to log as much detail as desired. However, the user will not be overwhelmed with logged messages in the log file because tracing tool 102 keeps only the messages logged from the beginning of the trace to an eventual error point. If no error occurs, then no trace messages are kept.

In one embodiment, the user may configure tracing tool 102 to keep messages at a certain level or higher whether or not an error occurs. In the example of FIG. 3, trace message 01 was kept in the trace log because tracing tool 102 was configured to keep all messages of level 1 or higher. Tracing tool 102 may keep only top or top n level messages if desired by the user. For example, in FIG. 2, the user may setup the trace to keep all messages at level 2 and higher (i.e., levels 1 and 2) regardless of whether an error occurs at those levels. Messages 01, 02, 03 (level 1) and messages 11, 12, 13, 21, 22, 23 (level 2) would be kept in addition to any messages in a sub-tree having an error.

Embodiments of the invention lead to efficient use of storage for log files as well as ease the burden on users to analyze log files. For example, if one logs an average of 10 messages and 10 function calls per function and there are 5 level deep function calls, that means that the tracing tool logs around $10+10^2+10^3+10^4+10^5=111,110$ messages. If, in the worst case scenario, an exception occurs inside the last level 5 function (i.e., at the end of the trace run) then the number of messages kept would be: 10+10+10+10+10=50 messages. By using embodiments of the invention, in general, if each function calls n functions and displays n messages on a m level deep function call tree, then the number of messages kept by tracing tool 102 is around n*m. The total messages kept by an ordinary logger (at the same verbosity level) would be around $n^m$.

If tests performed by test code are logged carefully (e.g., "opening file X from location Y" then "searching for this info in this file", etc.), then the tester can reconstruct all the scenario steps to the failure just by looking at the trace produced by tracing tool 102 inside the top exception handler upon a failure. Very often when a failure occurs, the tester knows what went wrong at that point (e.g., couldn't open a file) but the tester does not know under what context (e.g., the same file can be opened in several other places in the code). Using tracing tool 102, a tester may look in one place (e.g., trace log file 110) and find context information about the failure without having to look at the code, line numbers, etc. This is very useful for testers when debugging test failures in a lab, reducing investigation time considerably. This is also useful for testers who don't know much about the test run (e.g., the tester is not a test or development component owner). The tester can spot a problem just by reading the verbose explanation in trace log file 110.

Experience in test activity has shown that test failure investigation consumes a significant amount of time and people resources, and therefore, money. Embodiments herein are a way of reducing this considerably. In one embodiment, a tester logs his/her actions as one does in a personal log, i.e. very detailed (which most of the time is the case as the tester needs to provide personal logging even for the most verbose trace logging setting). But the tester does not have to be concerned with logging level and about clogging the logger's pipe with too much detail. On failure, only the historical context information related to the failure itself is kept and information of no use related to successful actions will have been trimmed.

Figure 4:
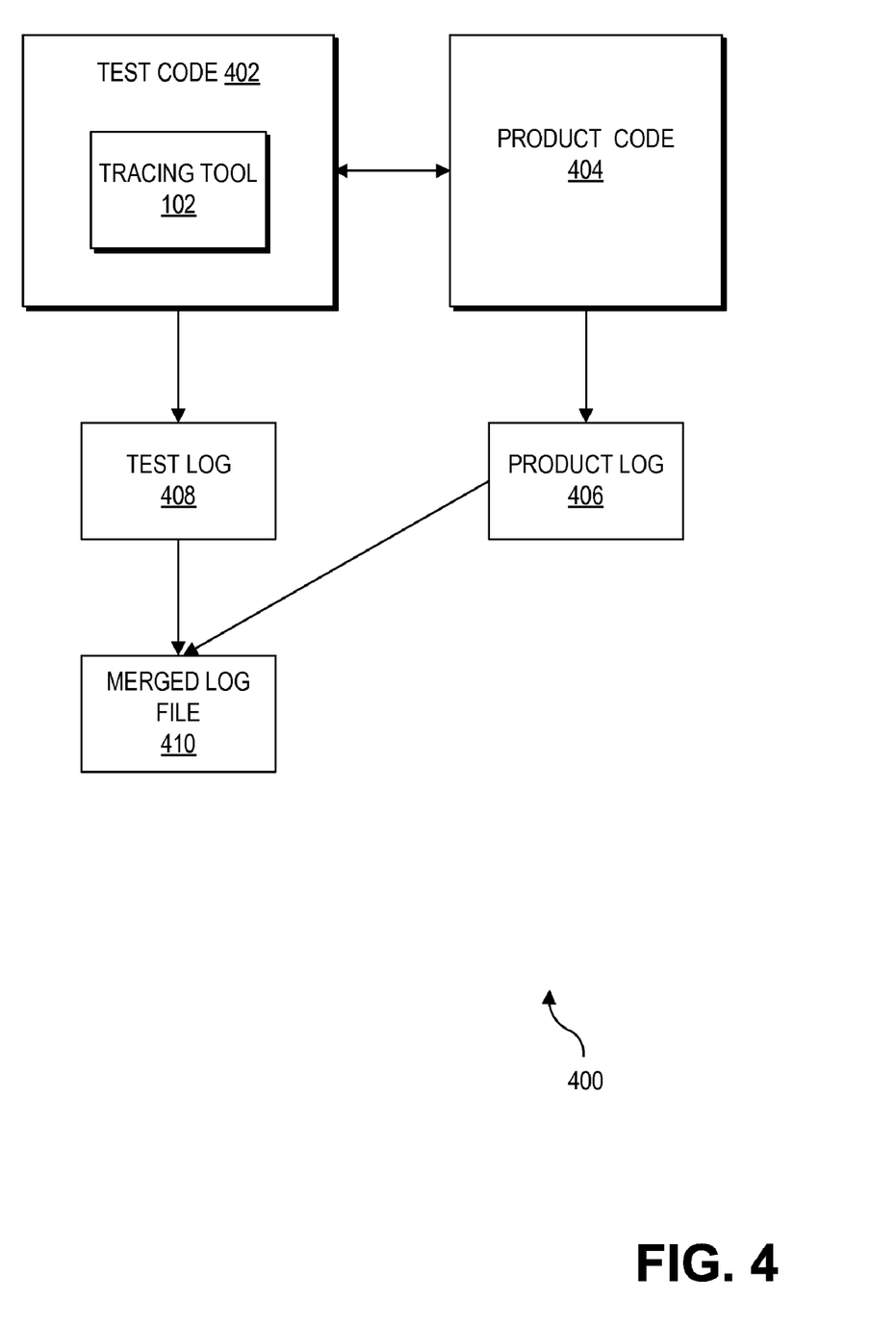
FIG. 4 is a block diagram of an error tracing system in accordance with an embodiment of the invention.

Turning to FIG. 4, in one embodiment of an error tracing system 400, the logging by tracing tool 102 may be enhanced by merging the logging performed by tracing tool 102 with messages logged by another component. System 400 includes test code 402 that is used to test product code 404. Tracing tool 102 generates test log 408 using embodiments as described above. Product code 404 also produces its own product log 406. Product log 406 includes messages, usually indexed by time stamp, regarding actions performed during execution of product code 404. In one embodiment, one or more components of system 400 may be implemented by computer readable instructions executable by one or more computing devices.

Tracing tool 102 may merge test log 408 and product log 406 to produce a single merged log file 410. In one embodiment, logs 408 and 406 are merged by matching time stamps of messages in each log. In another embodiment, messages in product log 406 that occurred after the error will also be trimmed from the merged log file 410. Thus, a user who wants to diagnose a problem looks in only one place (i.e., merged log file 410) and sees only meaningful test log and product log information. This "one stop" test failure diagnosis increases efficiency for the user and speeds up software testing. In one embodiment, in-memory test log 408 merges with a product log file on disk to generate merged log file 410 (on the disk as well).

Figure 5:
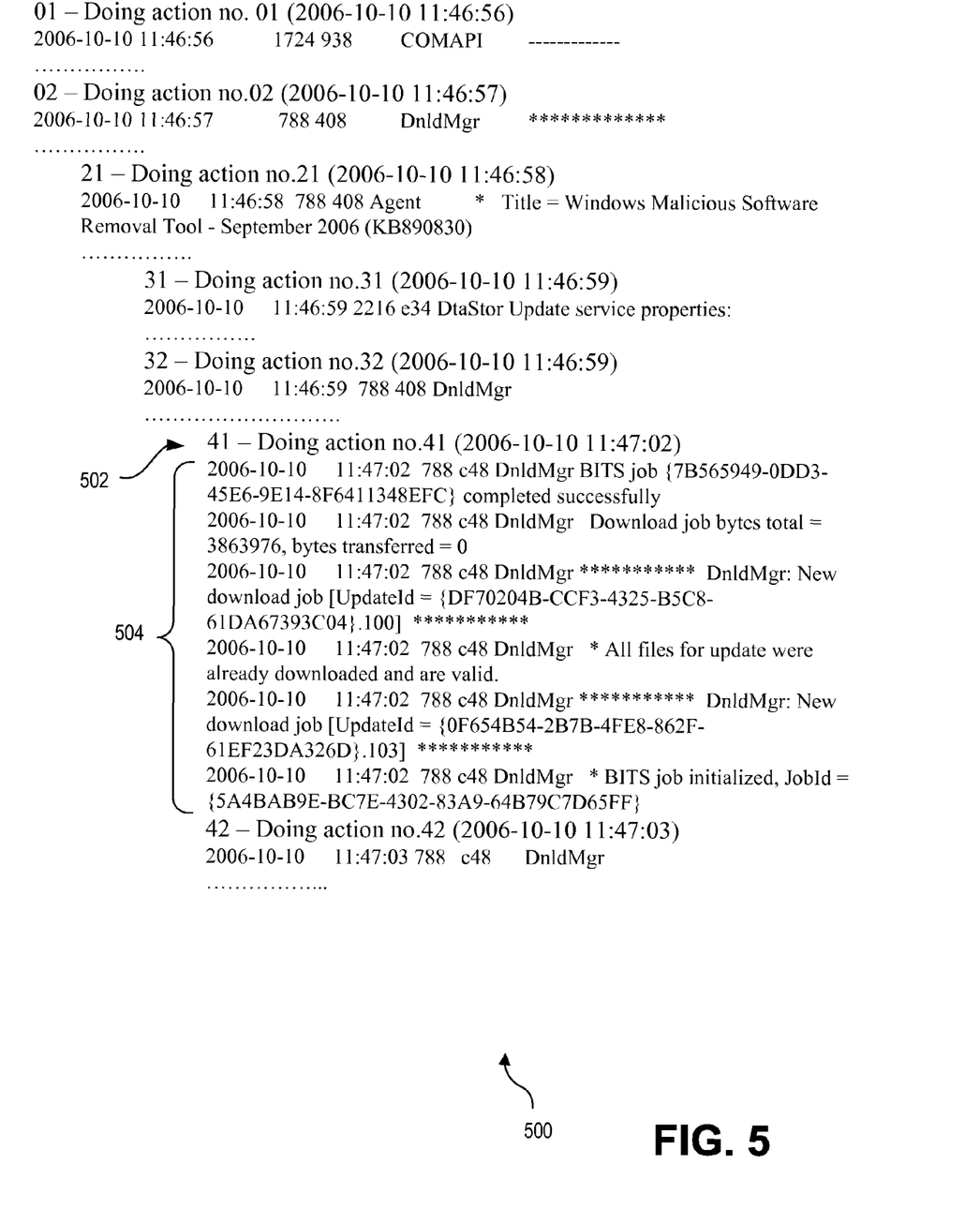
FIG. 5 is a log file in accordance with an embodiment of the invention.

Turning to FIG. 5, an embodiment of a log file 500 that is the result of merging two logs by tracing tool 102 is shown. Log file 500 is produced after the error occurred between messages 42 and 43 as shown in FIG. 3. Messages logged by tracing tool 102 are shown in log file 500 by their associated message numbers (same message numbers as in FIG. 3) and time stamps. Information from a product log, such as shown at 504, has been merged with message 41, shown at 502, based on time stamps. That is, the entries from two (or more) logs are aligned using the time stamps for the entries in each log. It will also be noted that the merged messages displayed in log file 500 are indented similarly as the tree data structure in FIG. 3 to aid the user in reading and analyzing log file 500.

In another embodiment, tracing tool 102 may trace individual threads in program code. The trace messages may be identified by a thread identification (ID) associated with the thread that executed the code for generating the message. Each thread can log trace messages in its own tracing tree structure. As one error is encountered in one thread the specific thread trace messages are output to a log file. In another embodiment, the tracing trees of all threads are merged up to the point in time when an error occurred in one of the threads.

Figure 6:
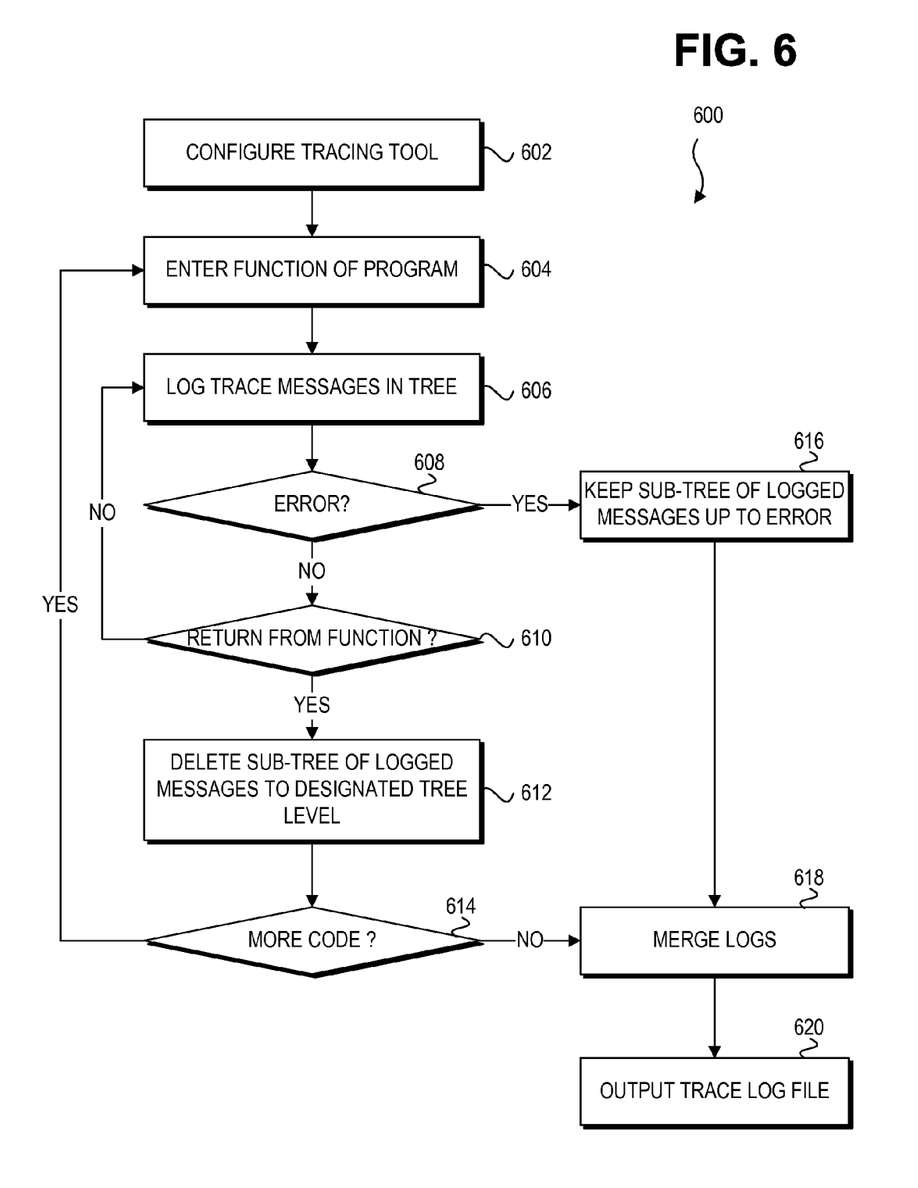
FIG. 6 is a flowchart showing operations of error tracing in accordance with an embodiment of the invention.

Turning to FIG. 6, a flowchart 600 shows operations of error tracing in accordance with an embodiment of the invention. In one embodiment, at least a portion of flowchart 600 may be implemented by computer readable instructions executable by one or more computing devices. In one embodiment, tracing tool 102 may perform at least some of the operations of flowchart 600.

Starting with operation 602, the tracing tool is configured. Tracing tool 102 may be configured by a user via a user interface, a command line, and the like. Configuring the tracing tool may include setting the trace level (e.g., minimal to verbose). Configuring the tracing tool may include setting the level at which logged trace messages are trimmed after a successful function return. For example, as described above, tracing tool 102 may keep all trace messages at or above a designated level regardless of whether an error occurred during function execution. In another embodiment, configuring tracing tool 102 includes designating the path to the one or more log files (e.g., product log 406) to be merged with trace log 104.

Proceeding to operation 604, a function in the program code is entered. When the code is first executed, this may be the main( ) routine. One skilled in the art having the benefit of this description will appreciate that the logic of flowchart 600 may be applied to multiple nested function call levels. Continuing to operation 606, trace messages are logged as dictated in the code. Proceeding to decision 608, the logic determines if an error has occurred in the code. If the answer is no, then the logic proceeds to decision 610 to determine if the function has returned. If the answer to decision 610 is no, then the logic returns to operation 606 where the function continues executing and logging trace messages (if any).

If the answer to decision 610 is yes, then the logic proceeds to operation 612 to delete the sub-tree of logged trace messages associated with the returned function and functions called by the returned function. In one embodiment, the trace messages are deleted at and lower than a designated level. Next, in decision 614, the logic determines if there is more code for execution. If the answer is yes, then the logic returns to operation 604 to continue code execution. If the answer is no, then the logic proceeds to operation 618 (discussed below).

Returning to decision 608, if an error occurs during execution of a function, then the logic proceeds to operation 616. At operation 616, the sub-tree of the logged messages that includes the error is kept. In one embodiment, the sub-tree entries in the tree data structure are flagged for keeping. Next, in operation 618, the trace log is merged with another log, if desired. In one embodiment, the logs are merged based on time stamps of the logged messages. Proceeding to operation 620, the trace log is output by tracing tool 102. For example, the trace log is stored in a trace log file, displayed in a display device, and the like. In one embodiment, the trace log is maintained in main memory as trace messages are logged (and/or trimmed) and then saved to a non-volatile storage device as a trace log file.

Embodiments herein provide an error trace method in which a trace tree collapses on success. Sub-trees corresponding to successful actions are trimmed (i.e., collapsed) automatically. Alternatively, trace messages at or above a designated function call level may be retained in the tree even when no errors occur. In the case of an error, the whole path from the root to the failure leaf remains intact. The trimming saves resources and allows for detailed logging in a first run that will be kept in cases of an error.

Figure 7:
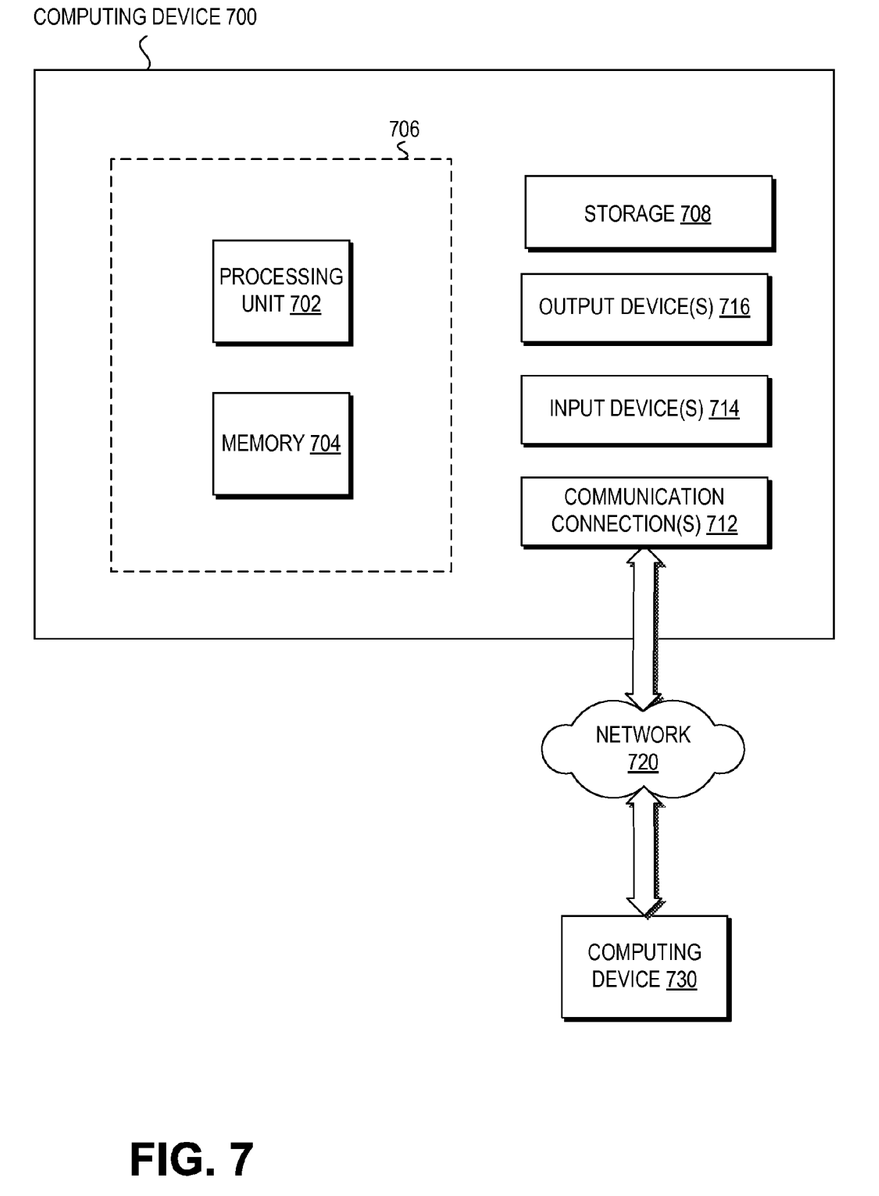
FIG. 7 is a block diagram of an example computing device for implementing embodiments of the invention.

FIG. 7 and the following discussion are intended to provide a brief, general description of a suitable computing environment to implement embodiments of the invention. The operating environment of FIG. 7 is only one example of a suitable operating environment and is not intended to suggest any limitation as to the scope of use or functionality of the operating environment. Other well known computing devices, environments, and/or configurations that may be suitable for use with embodiments described herein include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments of the invention are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 shows an example of a computing device 700 for implementing one or more embodiments of the invention. In one configuration, computing device 700 includes at least one processing unit 702 and memory 704. Depending on the exact configuration and type of computing device, memory 704 may be volatile (such as RAM), non-volatile (such as ROM, flash memory, etc.) or some combination of the two. This configuration is illustrated in FIG. 7 by dashed line 706.

In other embodiments, device 700 may include additional features and/or functionality. For example, device 700 may also include additional storage (e.g., removable and/or non-removable) including, but not limited to, magnetic storage, optical storage, and the like. Such additional storage is illustrated in FIG. 7 by storage 708. In one embodiment, computer readable instructions to implement embodiments of the invention may be in storage 708. Storage 708 may also store other computer readable instructions to implement an operating system, an application program, and the like.

The term "computer readable media" as used herein includes computer storage media. Computer storage media includes volatile and nonvolatile, removable and non-removable media implemented in any method or technology for storage of information such as computer readable instructions or other data. Memory 704 and storage 708 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 700. Any such computer storage media may be part of device 700.

Device 700 may also include communication connection(s) 712 that allow device 700 to communicate with other devices. Communication connection(s) 712 may include, but is not limited to, a modem, a Network Interface Card (NIC), an integrated network interface, a radio frequency transmitter/receiver, an infrared port, a USB connection, or other interfaces for connecting computing device 700 to other computing devices. Communication connection(s) 712 may include a wired connection or a wireless connection. Communication connection(s) 712 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, Near Field Communication (NFC), and other wireless media.

Device 700 may include input device(s) 714 such as keyboard, mouse, pen, voice input device, touch input device, infrared cameras, video input devices, and/or any other input device. Output device(s) 716 such as one or more displays, speakers, printers, and/or any other output device may also be included in device 700. Input device(s) 714 and output device(s) 716 may be connected to device 700 via a wired connection, wireless connection, or any combination thereof. In one embodiment, an input device or an output device from another computing device may be used as input device(s) 714 or output device(s) 716 for computing device 700.

Components of computing device 700 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 700 may be interconnected by a network. For example, memory 704 may be comprised of multiple physical memory units located in different physical locations interconnected by a network.

In the description and claims, the term "coupled" and its derivatives may be used. "Coupled" may mean that two or more elements are in contact (physically, electrically, magnetically, optically, etc.). "Coupled" may also mean two or more elements are not in contact with each other, but still cooperate or interact with each other (for example, communicatively coupled).

Those skilled in the art will realize that storage devices utilized to store computer readable instructions may be distributed across a network. For example, a computing device 730 accessible via network 720 may store computer readable instructions to implement one or more embodiments of the invention. Computing device 700 may access computing device 730 and download a part or all of the computer readable instructions for execution. Alternatively, computing device 700 may download pieces of the computer readable instructions, as needed, or some instructions may be executed at computing device 700 and some at computing device 730. Those skilled in the art will also realize that all or a portion of the computer readable instructions may be carried out by a dedicated circuit, such as a Digital Signal Processor (DSP), programmable logic array, and the like.

Various operations of embodiments of the present invention are described herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of embodiments of the invention, including what is described in the Abstract, is not intended to be exhaustive or to limit the embodiments to the precise forms disclosed. While specific embodiments and examples of the invention are described herein for illustrative purposes, various equivalent modifications are possible, as those skilled in the relevant art will recognize in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A method, comprising:
    logging trace messages in a tree data structure generated during execution of programming code in a trace log;
    deleting the logged trace messages logged during execution of a portion of the programming code from the tree data structure in the trace log when the portion of programming code executes without an error, wherein deleting the logged trace messages includes deleting logged trace message lower than a level designated within tree data structure, wherein each portion of the programming code has an associated level in the tree data structure;
    keeping the logged trace messages in the trace log when an error occurs during execution of the portion of the programming code; and
    outputting the trace log when execution of the programming code ends.

2. The method of claim 1 wherein deleting the logged trace messages includes deleting the logged trace messages lower than a designated call level within the portion of programming code.

3. The method of claim 1, further comprising:
    merging the logged trace messages with another log of messages associated with the programming code.

4. The method of claim 3 wherein the messages are merged based on time stamps of the messages.

5. The method of claim 1 wherein the portion of the programming includes a function, wherein the trace messages logged during execution of the function are deleted when the function executes without error.

6. The method of claim 1 wherein an error includes an exception that causes invoking of an exception handler associated with the exception.

7. The method of claim 1 wherein the programming code includes test code, product code, or any combination thereof.

8. The method of claim 1 wherein logging trace messages includes logging trace messages for each thread of execution of the programming code.

9. The method of claim 1 wherein the trace messages are logged in a tree data structure, wherein a sub-tree of the tree data structure is associated with the portion of the programming code.

10. One or more computer storage media including computer readable instructions that when executed perform the method of claim 1.

11. One or more computer storage media including computer readable instructions that when executed by a computing device perform operations comprising:
    logging trace messages in a tree data structure in a trace log generated during execution of a function of a program;
    when the function returns without an error occurring during execution of the function, deleting the logged trace messages from the tree data structure in the trace log, wherein deleting the logged trace messages includes deleting the logged trace messages lower than a level designated in the tree data structure, wherein each function of the program has an associated level in the tree data structure;
    when an error occurs during execution of the function, keeping the logged trace messages in the trace log that have been logged up to the error; and
    outputting the trace log when execution of the program ends.

12. The one or more computer storage media of claim 11 wherein deleting the logged trace messages includes deleting the logged trace messages in the trace log lower than a designated function call level.

13. The one or more computer storage media of claim 11 wherein the computer readable instructions when executed further perform operations comprising:
    merging the logged trace messages with logged messages from another log associated with the program by matching time stamps of the logged trace messages and the logged messages from the another log.

14. The one or more computer storage media of claim 11 wherein the computer readable instructions are part of a test code for testing product code.

15. The one or more computer storage media of claim 11 wherein the trace log is stored in memory of the computing device and outputting the trace log includes storing the trace log in a trace log file in a non-volatile storage device of the computing device.

16. A system, comprising:
    one or more processing units;
    one or more memory units coupled to the one or more processing units; and
    a non-volatile storage device coupled to the one or more memory units, the non-volatile storage device having stored computer readable instructions that when executed by the one or more processing units perform operations comprising:

logging trace messages in a tree data structure generated during execution of a function of test code to test product code, wherein the tree data structure is stored in the one or more memory units;

when the function returns without an error occurring during execution of the function, deleting the logged trace messages generated during execution of the function from the tree data structure, wherein deleting the logged trace messages includes deleting the logged trace messages lower than a level designated in the tree data structure, wherein each function of the test code has an associated level in the tree data structure;

when an error occurs during execution of the function, keeping the logged trace messages that have been logged up to the error in the tree data structure; and storing data from the data structure in the non-volatile storage device in a trace log file.

17. The system of claim 16 wherein deleting the logged trace messages includes deleting a sub-tree from the tree data structure associated with the logged trace messages from the function.

18. The system of claim 16 wherein the computer readable instructions when executed further perform operations comprising:

merging the logged trace messages with logged messages of a product log associated with the product code into the trace log file, wherein the messages are merged by matching time stamps of the logged trace messages and the logged messages of the product log.

19. The system of claim 16 wherein an error includes an exception that causes invoking of an exception handler associated with the exception.

* * * * *